United States Patent

[11] 3,607,886

| [72] | Inventor | Ian Moyle Lockhart |
| | | Egham, Surrey, England |
| [21] | Appl. No. | 819,091 |
| [22] | Filed | Apr. 24, 1969 |
| [45] | Patented | Sept. 21, 1971 |
| [73] | Assignee | Parke, Davis & Company |
| | | Detroit, Mich. |

[54] CHROMANAMINES
3 Claims, No Drawings

[52] U.S. Cl. .......................................... 260/345.2, 424/283
[51] Int. Cl. .......................................... C07d 7/20
[50] Field of Search .......................................... 260/345.2

[56] References Cited
OTHER REFERENCES

Bachman et al., J. Amer. Chem. Soc., vol. 70, pp. 599–601

*Primary Examiner*—John M. Ford
*Attorneys*—Robert R. Adams, David B. Ehrlinger, George M. Richards and Edward J. Gall ABSTRACT: An isomer of N,N,2-trimethyl-3-chromanamine, and its acid-addition salts (such as the hydrochloride, m.p. 217°–218° c.), having distinctive physicochemical and pharmacological properties. The compounds are produced by reacting the appropriate isomer of 2-methyl-3-chromanamine in free base or acid-addition salt form with a methylating agent.

CHROMANAMINES

SUMMARY AND DETAILED DESCRIPTION

The present invention relates to new heterocyclic compounds. More particularly, it relates to a certain particular isomer of N,N,2-trimethyl-3-chromanamine, hereinafter called the α-isomer, to acid-addition salts thereof, and to methods for the production of the foregoing compounds.

In free base form, the N,N,2-trimethyl-3-chromanamine, α-isomer, of the invention can be represented by the structural formula

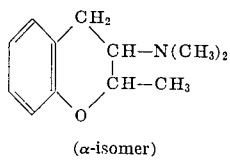

(α-isomer)

The designation "α-isomer" is arbitrarily selected and is used to mean that the dimethylamino and methyl groups have a certain relative configuration, as distinct from the opposite isomer, designated the β-isomer, in which the dimethylamino and methyl groups have a different relative configuration. In one of the isomers, the dimethylamino and methyl groups occupy a cis-configuration; whereas in the other isomer, the dimethylamino and methyl groups occupy a transconfiguration. It is not know with certainty whether the α-isomer of this invention has the cis- or trans- configuration. However, this information is not needed for the purpose of characterizing or identifying the product, because the α-isomer and β-isomer differ markedly in their physicochemical properties, for example in the melting points of their hydrochloride salts. The α-isomer of this invention can exist in racemic form as well as in the separate $d$- and $l$-forms In accordance with the invention, N,N,2-trimethyl- 3-chromanamine, α-isomer, and its acid-addition salts (also having the α-isomer configuration) can be produced by reacting 2-methyl-3-chromanamine, α-isomer, of the formula

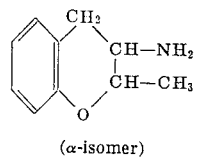

(α-isomer)

or an acid-addition salt thereof, with a methylating agent. In the two formulas indicated above, the dimethylamino and methyl groups of the first formula have the same relative configuration as the amino and methyl groups of the second formula.

Some examples of methylating agents suitable for use in the process of the invention are methyl halides, particularly methyl iodide; dimethyl sulfate; methyl sulfonates, such as methyl methanesulfonate and methyl p-toluenesulfonate; formaldehyde-formic acid mixtures; and formaldehyde and hydrogen in the presence of a noble metal catalyst. A preferred methylating agent is a formaldehyde-formic acid mixture. When the methylating agent is a methyl halide, methyl sulfonate, or dimethyl sulfate, the reaction is preferably carried out in the presence of a base such as potassium carbonate, sodium carbonate, or sodium bicarbonate. The choice of solvent for the reaction depends on the particular methylating agent used. When the methylating agent is formaldehyde-formic acid, and excess of formic acid serves as a solvent and an additional solvent is neither necessary nor desirable. With other methylating agents any of a variety of solvents can be used. These include hydrocarbons such as benzene, toluene, and xylene; ethers such as diethyl ether, dioxane, tetrahydrofuran, and diethylene glycol dimethyl ether; lower alkanols such as methanol, ethanol, and isopropyl alcohol; and tertiary amides such as N,N-dimethylformamide and N-methyl-2-pyrrolidinone. Lower alkanones such as acetone and 2- butanone are satisfactory solvents when the methylating agent is dimethyl sulfate or methyl halide or methyl sulfonate. However, lower alkanones are avoided when the methylating agent is formaldehyde and hydrogen in the presence of a noble metal catalyst. In general, 2moles of methylating agent are required for each mole of primary amine, but it is preferred to use a moderate excess of the methylating agent. The time and temperature of the reaction are not critical but depend somewhat on the particular methylating agent used. In general, the reaction is carried out at a temperature between about 10° to 150° C. or the reflux temperature of the solvent for from 1to 48hours, the longer reaction times being used at the lower temperatures. when using a formaldehyde- formic acid mixture as the methylating agent, the preferred conditions are a temperature between 70° C. and the reflux temperature of the reaction mixture for from 4to 16hours. With other methylating agents, it is satisfactory to carry out the reaction at room temperature for about 4to 24hours, or alternatively for a somewhat shorter time at a higher temperature. The product can be obtained from the reaction mixture in either free base or acid-addition salt form by adjustment of the pH.

The 2-methyl-3-chromanamine, α-isomer, and its acid-addition salts, required as starting material in the foregoing process, can be prepared by any of a variety of methods. For example, 2-methyl-3-nitro-2H-1-benzopyran is reacted with lithium aluminum hydride in anhydrous ether and the product is treated with water and with dilute hydrochloric acid, made basic, and extracted with ether. 2-methyl -3-chromanamine, α-isomer, is obtained by evaporation of the ether extract and is converted to any desired acid-addition salt by reacting it with an acid. 2-methyl- 3-chromanamine, α-isomer, hydrochloride salt, has m.p. 260 –261° C.

The free bases of the invention form acid-addition salts with any of a variety of inorganic and organic acids. Pharmaceutically acceptable acid-addition salts are formed with such acids as hydrochloric, hydrobromic, sulfuric, nitric, phosphoric, acetic, citric, tartaric, succinic, benzoic, salicylic, maleic, malic, gluconic, ascorbic, and pamoic acids. The free bases and their salt forms are interconvertible by adjustment of the pH. They differ in solubility properties but in general are otherwise equivalent for the purposes of the invention.

The N,N2-trimethyl-3-chromanamine, α-isomer, of the invention and its acid-additon salts can be distinguished from N,N,2-trimethyl-3-chromanamine, β-isomer, and its acid-addition salts by difference in their physicochemical properties and in their pharmacological properties. A simple and direct way of distinguishing between the α-isomer and the β-isomer is by observing the melting points of their hydrochloride salts. The N,N,2-trimethyl-3-chromanamine, α-isomer, hydrochloride salt of the invention has m.p. 217°–218° C. The N,N,2-trimethyl-3-chromanamine, β-isomer, hydrochloride salt has m.p. 195°–197° C. N,N,2-trimethyl-3-chromanamine, β-isomer, and its acid-addition salts can be produced by reacting 2-methyl-3-chromanamine, β-isomer, or an acid-addition salt thereof, with a methylating agent according to the general procedures described herein.

The N,N,2-trimethyl-3-chromanamine, α-isomer, of the invention and its acid-addition salts are useful pharmacological agents. They produce a favorable effect on the hyperemotionality resulting from brain damage. One way that this activity can be demonstrated is by measuring their ability to reduce septal hyperirritability. In this test procedure the septal area of the forebrain of rats is first destroyed by electrocoagulation. Three days later the animals are examined and rated for hyperirritability by observing the intensity of each animal's response to four different stimuli. The stimuli used are (a) strong tactile stimulus administered as a prod on the back, (b) a stimulus resulting from attempting to pick up the animal with a gloved hand, (c) a visual stimulus produced by slowly moving rubber-tipped crucible tongs toward the face of the animal, and (d) a mild tactile stimulus produced by blowing a puff of air on the back of the animal. For each stimulus the ratings are -1 for a response less than that expected from an unoperated rat; 0 for a response equivalent to that expected from an unoperated rat; +1 for a moderately exaggerated response; and +2 for a highly exaggerated response. Thus, the maximum possible score for hyperirritability in a rat is 8. Only animals scoring 6 or more on the 3rd. day after operation are used in the test procedure. The animals are graded prior to dosing and thereafter at 0.5, 1, 2, 3, and 5 hours after dosing, or after other selected time periods. In this test procedure N,N,2-trimethyl-3-chromanamine caused a significant suppression of hyperirritability following doses of 12.5 to 100 mg./kg. intraperitoneally. The does required to produce a 50 percent reduction in hyperirritability rating compared with normal rats was estimated at approximately 30 mg./kg. N,N,2-trimethyl-3-chromanamine suppresses the hyperirritability of septal lesioned rats without causing the profound generalized depression associated with the use of tranquilizers and sedative-hypnotic drugs in this test procedure.

The activity of N,N, 2-trimethyl-3 -chromanamine, α-isomer and its acid-additon salts can also be demonstrated by their ability to suppress the mouse-killing instinct in so-called killer rats. A small percentage of rats (about 11 percent of the male Sprague-Dawley strain) spontaneously attack and kill a mouse introduced into the cage. In this test procedure a mouse is placed in the home cage of each killer rat 30 minutes after the rat has been treated with a test drug. The rat is observed for a period of 30 minutes thereafter. It is known that various types of drugs are capable of suppressing this mouse-killing instinct. For example, sedative drugs are effective at dose levels producing generalized depression; and stimulants are effective at dose levels producing visible excitement. Antidepressant drugs known to be useful in the treatment of endogenous depressions suppress mouse-killing at dose levels which do not produce other obvious effects. Similarly, N,N,2-trimethyl- 3-chromanamine, α-isomer, suppresses mouse-killing at dose levels which produce no other obvious changes in the behavior of the caged rat. The median effective dose, that is the dose estimated to suppress the killing instinct in 50 percent of the rats, was estimated at about 15 mg./kg. given intraperitoneally.

The intravenous injection of doses up to 2–4 mg./kg. of N,N,2-trimethyl-3-chromanamine, α-isomer, into the pentobarbital anesthetized dog is usually followed by only minor and insignificant changes in systemic arterial blood pressure. Doses in excess of 4 mg./kg. are followed by a fall in arterial blood pressure. Doses of 16–32 m.g./k.g. partially antagonize the pressor response produced by injecting epinephrine. On the other hand, the related compound N,N-dimethyl-3-chromanamine, injected intravenously at does between 1 and 16 mg./kg., produce an immediate and distinct rise in arterial blood pressure. The pressor effect of N,N-dimethyl-3-chromanamine is reversed by adrenergic blocking does of phenoxybenzamine, otherwise known as N-(2-chloroethyl)-N-(1-methyl-2-phenoxyethyl)-benzylamine.

The pharmacological activity pattern of N,N,2-trimethyl-3-chromanamine, α-isomer, and its acid-additon salts can also be shown in a number of other assay procedures. The compounds increase the tolerance of mice to being placed on a copper plate maintained at 55° C. In this test, the mean effective dose (ED$_{50}$) was determined as 20.5± 2.5 mg./kg. administered subcutaneously. The compounds of the invention also have antiemetic activity.

The invention is illustrated by the following examples.

EXAMPLE 1

A mixture of 35.3 g. of 2-methyl-3-chromanamine, α-isomer, 39.2 ml. of 90 percent aqueous formic acid, and 63.0 ml. of 36 percent aqueous formaldehyde is heated at reflux for 7 hours. The resulting solution is cooled, basified with 2N aqueous sodium hydroxide and extracted with ether. The ether extract is washed with water, dried, and evaporated to give a residue of N,N,-trimethyl-3-chromanamine, α-isomer. For purification, the product is distilled in vacuo; b.p. 90°–96° C. at 0.9 mm.

The hydrochloride salt of N,N,2-trimethyl-3-chromanamine, α-isomer, is prepared by adding a slight excess of ethereal hydrogen chloride to a solution of the free base in anhydrous ether and collecting the precipitated product; m.p. 217°–218°C. after crystallization from ethanol.

A salt with citric acid is obtained by adding a solution of citric acid in methanol to an equimolar amount of the free base in methanol and concentrating the mixture to a small volume.

EXAMPLE 2

A solution of 5.0 g. of 2-methyl-3-chromanamine hydrochloride, α-isomer, (m.p. 260°–261°C.) and 7.5 ml. of 40 percent aqueous formaldehyde in 10 ml. of water and 20 ml. of ethanol is shaken with hydrogen at atmospheric pressure in the presence of a catalytic amount (0.1 g.) of 10 percent palladium on charcoal, until the uptake of hydrogen ceases. The catalyst is removed by filtration and the filtrate evaporated to dryness at reduced pressure. The residue is dissolved in 150 ml. of 2N hydrochloric acid and the solution is washed with ether. The acidic aqueous solution is basified with 10N aqueous sodium hydroxide and extracted with ether. The ether extract is washed with water, dried, and evaporated to give a residue of N,N,2-trimethyl-3-chromanamine, α-isomer.

The hydrochloride salt of N,N,2-trimethyl-3-chromanamine, α-isomer. is prepared by adding a slight excess of ethereal hydrogen chloride to a solution of the free base in anhydrous ether and collecting the precipitated product; m.p. 217°–218° C. after crystallizations from isopropyl alcohol and ethanol.

The starting materials for use in the foregoing examples can be obtained as follows. A solution of 59 g. of 2-methyl-3-nitro-2H-1-benzopyran in 1.0 liter of anhydrous ether is added dropwise with stirring to a mixture of 40 g. of lithium aluminum hydride in 1.0 liter of anhydrous ether over a period of 75 minutes. The resulting mixture is stirred and heated at reflux for 5 hours. The mixture is cooled, stirred with 160 ml. of water, and allowed to stand for 16 hours. The precipitated salts are removed by filtration and the filter cake is washed several times with hot ethyl acetate. The combined filtrate and washings are extracted four times with 200 ml. portions of 2N hydrochloric acid. The aqueous acid extracts are combined, basified with 10N aqueous sodium hydroxide, and extracted with ether. The ether extract is dried and evaporated to give a residue of 2-methyl-3-chromanamine, α-isomer. For purification, the product is distilled in vacuo; b.p. 85°–86° C. at 0.8 mm.

The hydrochloride salt of 2-methyl-3-chromanamine, α-isomer, is prepared by passing dry hydrogen chloride gas into a solution of the free base in anhydrous ether and collecting the precipitated product; m.p. 260°–261° C. after crystallizations from isopropyl alcohol and from aqueous ethanol.

I claim:

1. A member of the class consisting of the α-isomer of N,N,2-trimethyl-3-chromanamine and acid-addition salts thereof.

2. A compound according to claim 1 which is the α-isomer of N,N,2-trimethyl-3-chromanamine.

3. A compound according to claim 1 which is the α-isomer of N,N,2-trimethyl-3-chromanamine hydrochloride.